June 22, 1954     L. O. SIMENSON ET AL     2,681,737
VALVE

Filed April 7, 1951                                  3 Sheets-Sheet 1

INVENTORS.
Louis O. Simenson
John S. Carpenter
Arthur B. Greenwood
BY *Griswold & Burdick*
ATTORNEYS June 22, 1954 L. O. SIMENSON ET AL 2,681,737
VALVE
Filed April 7, 1951 3 Sheets-Sheet 2

INVENTORS.
Louis O. Simenson
John S. Carpenter
Arthur B. Greenwood
BY Griswold & Burdick
ATTORNEYS

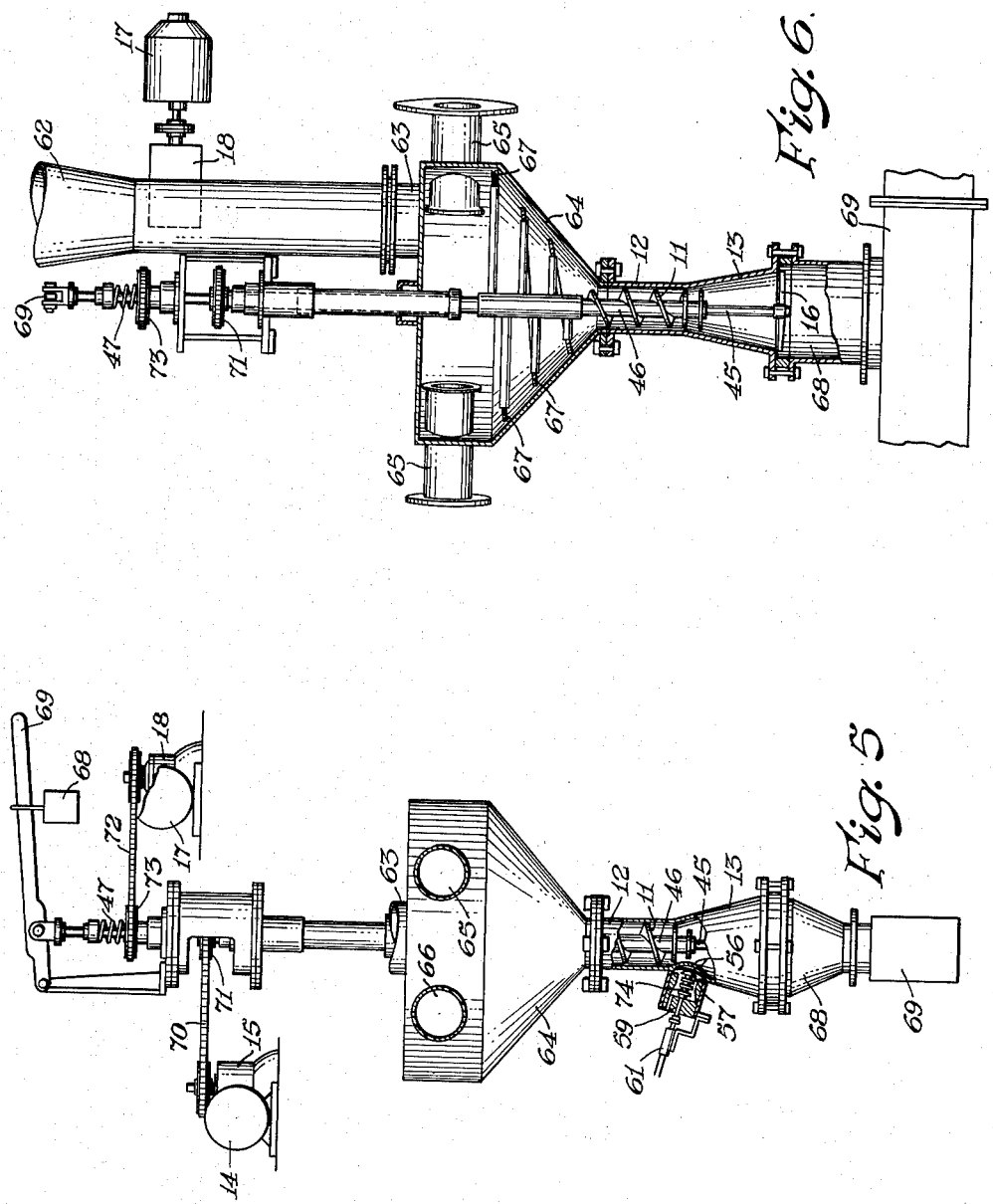

Patented June 22, 1954

2,681,737

UNITED STATES PATENT OFFICE 2,681,737

VALVE

Louis O. Simenson, Pittsburg, John S. Carpenter, Concord, and Arthur B. Greenwood, Pittsburg, Calif.; Shirley M. Greenwood, attorney-in-fact for said Arthur B. Greenwood, assignors to The Dow Chemical Company, Midland, Mich., a corporation of Delaware Application April 7, 1951, Serial No. 219,774

5 Claims. (Cl. 214—17)

This invention relates to a valve suitable for transferring solids in powder or dust form from one atmosphere to another, and is concerned particularly with a valve which will effect such a transfer without admitting significant amounts of the one atmosphere to the other. More especially, the invention is concerned with a valve which receives the fine solids from one atmosphere, compacts them to form a plug, and discharges them again from the far end of the plug into the other atmosphere.

There are many chemical processes in which powdered solids must be moved from the air into an atmosphere of chemical vapors, and it is often undesirable to admit much air to the closed vessel or to lose much vapor therefrom. In other cases, solids in the form of fine powders must be removed from a container having one gaseous atmosphere into a different atmosphere. Sometimes the actual analysis of the atmosphere may be the same on both sides of the partition through which the solids are to be moved, but a higher pressure is maintained on one side than the other. Various valves have been proposed for effecting such transfers of powdered solids, and the common barrel valve is one of these. It has been found that barrel valves do not form a sufficiently good seal between the two atmospheres, since a pocket of the undesired atmosphere is moved from one vessel to the other as each segment of the valve is turned to a position to be filled. Common screw conveyors often fail to provide the required seal, and, where one of the separated atmospheres contains a condensible vapor, condensation often occurs in and around the powdered solid, tending to moisten it and convert it to an undesirably pasty consistency. Even when the atmosphere in contact with the fine solids is a dry one, screw conveyors do not form effective means of solving the problem. Thus, with screws of diminishing pitch, or with discharge tubes with cylindrical walls or with walls converging toward the outlet, such dense compacting occurs that the solids "seize" the worm and jam the equipment. In short, there is need for improvement in valves for the stated purpose, and it is the principal object of the present invention to provide such an improved valve. Other and related objects may appear hereinafter.

According to the present invention, the foregoing and related objects may be attained through the provision of a valve consisting essentially of a positive displacement screw conveyor means for advancing finely divided solids through a barrel, a right frusto-conical section beyond such screw means in the path of flow of the solids, having its smaller end continuous with the barrel of the screw section and having a vertical angle of 3° to 10° between the generatrix of the cone and its axis, a rotatable or reciprocating abrader closing the far end of said frusto-conical section, means for driving the screw conveyor, and means, responsive to a predetermined load and degree of compaction of fine solids in the frusto-conical section, to rotate or reciprocate the abrader to effect detrition of the solids plug and to discharge solids from the valve so long as the requisite load and compaction is maintained on the plug of said solids formed in said conical portion of the valve barrel. The positive displacement screw conveyor may have a single screw flight or it may have two rotors with intermeshing screw flights which are mutually cleansing. This latter arrangement is advantageous when handling solids which tend to be cohesive when compacted. Such dual screws can be of the same or of opposite hand. The extension of the conveyor barrel is given an outwardly flaring frusto-conical shape because experience has shown that too great a resistance to forward movement is developed by a compacted body of many solids in cylindrical tubes, but that, by "easing" the walls of the tube from 3° to 10° (so that the included angle is 6° to 20°), this problem may be avoided. The abrader, usually a rotatable disk, whose operation effects detrition of the plug of solid particles as the latter emerges from the conical section, may have radial ridges on the face toward the opening of the conical tube or it may have a knurled surface, or may be made of suitably reinforced coarse screen, through which the particulate solid material may be discharged as rapidly as it is abraded from the end of the compact plug. Any of several means may be employed to make operation of the abrader disk responsive to a predetermined load and degree of compaction of the solid particles in the conical tube. Thus, the disk can be driven by a motor which receives its electric power only when the torque on the motor driving the conveyor worm exceeds a preselected value. Alternatively, the motor driving the abrader disk may be made responsive to a preselected minimum pressure at some point on the surface of the frusto-conical tube. These and other variations of the invention may be understood from the following more detailed description and the accompanying drawings, wherein Fig. 1 is a diagrammatic view of one form of the apparatus and controls therefor;

Fig. 5 is an elevation, partially cut away, of an industrial adaptation of the invention;

Fig. 6 is a vertical section taken along the line 6—6 through the apparatus in Fig. 5;

Figure 1:
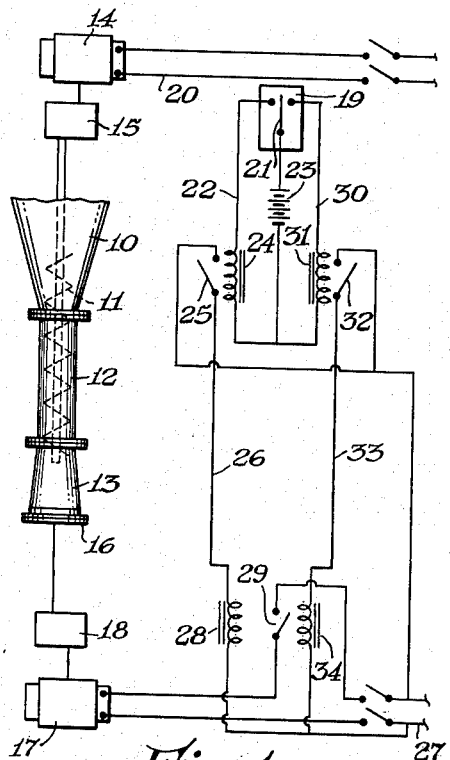

Referring to the drawings, Fig. 1 illustrates the new dust valve installed beneath a cyclone separator 10. The worm 11 of a screw conveyor extends downwardly from the cyclone 10 into and through a cylindrical barrel 12 and thence a short distance into the top of a compacting tube 13 which is a frusto-conical extension of barrel 12. Worm 11 is driven by motor 14 through reduction gear 15. Beneath, and held against, the circular outlet of compacting tube 13 is a ribbed rotatable disk 16, which may be driven by motor 17 through reduction gear 18. An ammeter 19 is installed in the power line 20 to motor 14, and has switch 21 mounted so as to close circuit 22 when the torque on motor 14 increases, as shown by increased current requirements. Current from battery 23 activates relay 24, closing switch 25. This allows current to flow through circuit 26 from power line 27, activating relay 28 which closes switch 29 and brings current to motor 17, to drive the abrader disk 16 and discharge solids from the lower end of the compacted plug of solids in compacting tube 13. When the load on motor 14 is reduced, due to a decrease in the compaction of the solids in tube 13, the current requirements of motor 14 decrease. As the current in line 20 falls below a predetermined value, switch 21 moves to open circuit 22 and to close circuit 30, which activates relay 31 and closes switch 32 in circuit 33. As current from line 27 flows through relay 34 in circuit 33, switch 29 is opened and motor 17 and abrader disk 16 come to a stop.

Figure 2:
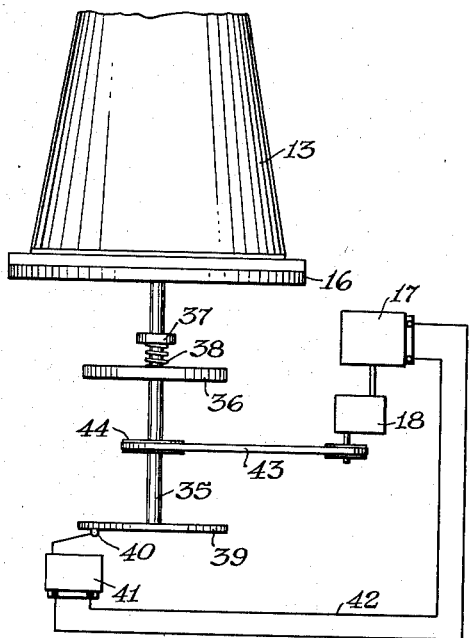
Fig. 2 is a diagrammatic representation of a part of the apparatus with another type of control system.

Fig. 2 shows another form of control for abrader disk 16. The latter disk is rotatably mounted on the end of shaft 35, which passes through bearing plate 36 and carries collar 37 and compression spring 38 above plate 36. Another plate 39 is mounted at the lower end of shaft 35, so as to be just in contact with the trip lever 40 of microswitch 41 when the latter is open and disk 16 is pressed firmly against the end of compacting tube 13. As pressure increases on disk 16, due to increased load and compaction of solids in tube 13, sufficient to compress spring 38, plate 39 depresses lever 40 and closes switch 41, bringing current to motor 17 through line 42. This drives reduction gear 18 and belt 43, and the latter drives shaft 35 and disk 16 through pulley 44, until the load on disk 16 is reduced enough so that spring 38 becomes decompressed sufficiently to lift plate 39 away from lever 40, opening switch 41.

Figure 3:
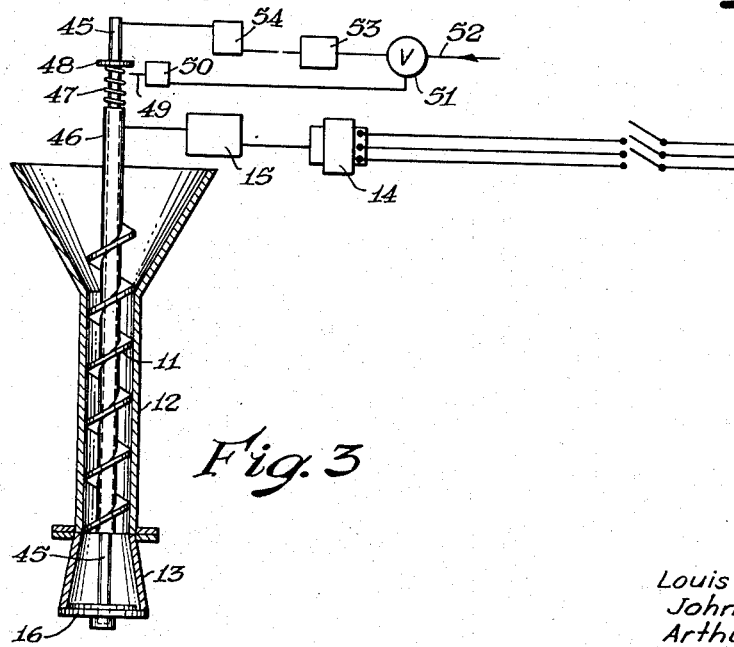
Fig. 3 is a diagrammatic representation of yet another form of the apparatus, and controls.

For many uses of the new valve, it is preferred that the abrader disk 16 be supported by and driven from a shaft extending through the valve, instead of an external shaft, as suggested in Figs. 1 and 2. Such an arrangement is illustrated in Fig. 3, wherein spinner shaft 45 is concentric with the root shaft 46 of feed worm 11. Shaft 46 and worm 11 are driven through reduction gear 15 by motor 14. Abrader disk 16 is held against the end of compacting tube 13 by spring 47, pressing against collar 48. As the load and degree of compaction of solids in tube 13 overcomes the resistance of spring 47, downward movement of collar 48 depresses lever 49 of air controller 50, opening air valve 51 in line 52, and starting or increasing the speed of air motor 53 which drives shaft 45 and abrader disk 16 through reduction gear 54.

Figure 4:
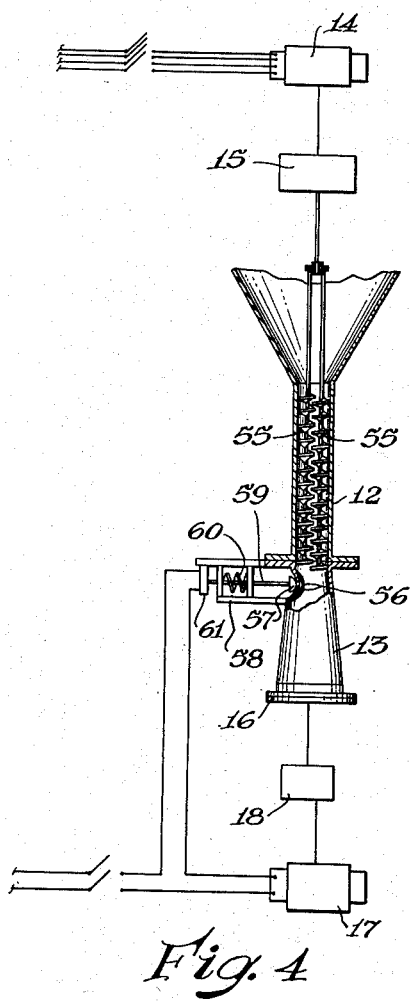
Fig. 4 is a diagrammatic representation of the apparatus with a different control system.

In Fig. 4, motor 14 and reduction gear 15 are illustrated as driving twin screws 55, which are intermeshed and self-cleansing and feed finely divided solids through barrel 12 into compacting tube 13. Fig. 4 also illustrates another type of control for rotation of the abrader disk 16. A flexible diaphragm 56 is sealed over an opening in the upper wall of frusto-conical tube 13. Diaphragm 56 is backed up by a piston 57, in cylinder 58. Piston rod 59 may be spring loaded, as by compression spring 60. When the load and degree of compaction of solids in tube 13 are such as to overcome the resistance of spring 60, rod 59 is pushed back and actuates microswitch 61, starting motor 17 and reduction gear 18, and causing abrader disk 16 to rotate against the end of the compacted solids plug, thus discharging fine solids from tube 13. Depletion of solids inventory in tube 13, or reduction in the compaction of those solids, reduces the pressure against diaphragm 56 and allows piston 57 to move forward and open switch 61, shutting off motor 17 and stopping the rotation of abrader disk 16.

Figs. 5 and 6 illustrate an industrial installation of the new valve used to transfer a potentially pyrophoric dust from a totally enclosed spray drier system having an explosive atmosphere of condensible vapors to an enclosed conveyor, which carries the powder to pelleting or packaging apparatus. The pyrophoric powder is dropped from the cone bottom of the drier 62 through spout 63 into an enclosed hopper 64 in which an inert atmosphere is maintained by means of gas circulated through ducts 65 and 66. The finely divided solids are impelled downward into the feed tube 12 of the new valve, by means of a helical scraper blade 67, and are forwarded into the frusto-conical compacting tube 13 by the positive displacement worm 11. Tube 13 has an included angle of 12°, and is closed by abrader disk 16 which, in operation, discharges the particulate solid through duct 68 into tunnel 69, from which the solids are conveyed, by means not shown, to a packaging or pelleting station. Abrader disk 16 is carried on shaft 45 which is smaller than and concentric with the hollow shaft or root 46 of feed worm 11. The force with which disk 16 is held against the mouth of compacting tube 13 may be varied by variation of the position of weight 68 on lever arm 69, causing corresponding changes in the degree of compression on spring 47. Feed worm 11, and helical scraper 67, both mounted on shaft 46, are driven by motor 14 and reduction gear 15, through chain 70 and sprocket 71. Spinner shaft 45 is independently driven by motor 17 and reduction gear 18 through chain 72 and sprockets 73. The on-off control for motor 17 and abrader disk 16 is similar to that described with respect to Fig. 4, and comprises a flexible diaphragm or pair of diaphragms 56 sealed over an opening in the upper wall of tube 13 opposite the lower end of worm 11, backed up by piston 57 and piston rod 59, displacement of which, against the pressure of bellows 74, actuates microswitch 61, closing the circuit (not shown) to motor 17.

Figure 7:
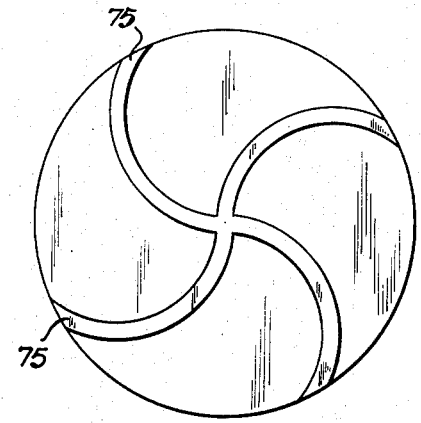
Fig. 7 is a plan view of one type of abrader disk for use in the apparatus of the invention; and, Fig. 8 is a plan view of another type of abrader disk.

Fig. 7 illustrates the working face of a type of abrader disk 16 which is especially useful with dry and non-cohesive powders. In this modification the disk member is an imperforate plate and there is a plurality of raised vanes 75 which are symmetrically positioned radially about the axis of rotation of disk 16, each such vane being a segment of a circle. In operation, these vanes scrape solids from the compacted mass in tube 13 and discharge these solids from the periphery of disk 16 as the latter rotates. Such a disk is prone to become inoperative with cohesive solids, however, as the latter tend to form a cake between the vanes so that the rotating disk presents a smooth and non-abrading face to the solids in tube 13.

Figure 8:
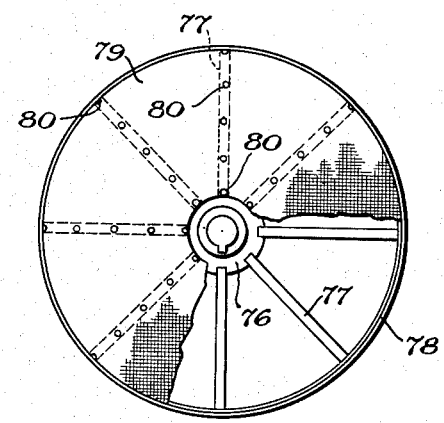

Another and more generally satisfactory abrader disk 16, which can be used with either cohesive or non-cohesive particulate solids, is illustrated in Fig. 8. This disk comprises a rigid frame, consisting of a hub 76, a plurality of radial spokes 77 and a rim 78, over which is secured a coarse screen 79, which may be spot welded or soldered, as at 80, to the hub, spoke and rim members. This spinner, in operation, has a greater capacity than that illustrated in Fig. 7. A screen is employed which is fine enough to prevent sifting action when the disk 16 is stationary, and yet is sufficiently coarse to allow free discharge of the solids from tube 13 when disk 16 is rotated against the plug of compacted solids therein.

The abrader need not be a flat disk, and it has been found effective to use instead a conical abrader having an obtuse included angle.

References herein to the rotation or spinning of abrader disk 16 against the face of the compacted solids should not be construed as limiting the invention to apparatus in which the disk is capable of unidirectional rotation only. It is apparent that effective detrition of the solids plug may be accomplished by alternate rotation of the disk in opposite directions, i. e., by oscillatory rotation. Similarly, non-circular abraders may be used, and a shuttle motion may be imparted to them to effect detrition of the solids plug.

It is desirable to be able to adjust the force holding abrader disk 16 against the mouth of tube 13, and to be able to adjust the on-off control of the motor which drives the abrader disk, to change the degree of compaction to which the disk is responsive. Such changes are desirable to fit variations in the type or the compressibility of the solids being handled, or changes in the pressure differential between the atmospheres from and to which the solids are being moved. Spring 47 and bellows 74 are both adjustable, or changeable, to permit such variations in the operating conditions.

Reference has been made herein to the operation of the abrader intermittently. It is not necessary that the abrader come to a full stop when the degree of compaction of the plug diminishes, as a convenient mode of operation involves continuous motion of the abrader at a rate proportional to the degree of compaction of the solids plug.

While several means have been illustrated for driving the abrader and thus for discharging particulate solids from the valve by detrition of the plug of compacted particles therein, it is apparent that yet other such means may be employed, and that such other means, if responsive to the load and degree of compaction of the solids in the frusto-conical tube 13, are equivalents of the ones here disclosed.

We claim:

1. A valve for the purpose described, comprising a positive displacement screw conveyor means, in communication with a source of fine particulate solids and extending through a close-fitting barrel, a frusto-conical tubular extension of said barrel having an included conical angle of from 6° to 20°, an abrader covering the larger, open end of the frusto-conical tube, means for driving the conveyor to deliver particulate solids to and compact them in the frusto-conical tube, and means, responsive to a predetermined load and degree of compaction of fine solids in the frustoconical tube, to move the abrader across the face of the compacted solids to effect detrition of the solids plug and to discharge solids from the valve so long as the requisite load and compaction of solids is maintained in the tube.

2. A valve for the purpose described, comprising a positive displacement screw conveyor means, in communication with a source of fine particulate solids and extending through a close-fitting barrel, a frusto-conical tubular extension of said barrel having an included conical angle of from 6° to 20°, a rotatable abrader covering the larger, open end of the frusto-conical tube, means for driving the conveyor to deliver particulate solids to and compact them in the frusto-conical tube, and means, responsive to a predetermined load and degree of compaction of fine solids in the frusto-conical tube, to rotate the abrader to effect detrition of the solids plug and to discharge solids from the valve so long as the requisite load and compaction of solids is maintained in the tube.

3. A valve for the purpose described, comprising a positive displacement screw conveyor means, in communication with a source of fine particulate solids and extending through a close-fitting barrel, a frusto-conical tubular extension of said barrel having an included conical angle of from 6° to 20°, a rotatable abrader covering the larger, open end of the frusto-conical tube, an electric motor for driving the conveyor to deliver particulate solids to and compact them in the frusto-conical tube, and means, responsive to changes in the current requirements of said motor corresponding to changes in the load and compaction of solids in said tube above and below predetermined values, to increase and decrease the rate of rotation of the abrader to effect detrition of the solids plug and to discharge solids from the valve so long as the requisite load and compaction of solids is maintaind in the tube.

4. A valve for the purpose described, comprising a positive displacement screw conveyor means, in communication with a source of fine particulate solids and extending through a close-fitting barrel, a frusto-conical tubular extension of said barrel having an included conical angle of from 6° to 20°, a rotatable abrader covering the larger, open end of the frusto-conical tube, means for driving the conveyor to deliver particulate solids to and compact them in the frusto-conical tube, and electric switch means behind a flexible diaphragm in the wall of the frusto-conical tube near its smaller end, responsive to increases and decreases in the load and degree of compaction of fine solids in said tube to start and stop a motor which rotates the abrader to effect detrition of the solids plug and to discharge solids from the valve so long as the requisite load and compaction of solids is maintained in the tube.

5. A valve for the purpose described, comprising a positive displacement screw conveyor means, in communication with a source of fine particulate solids and extending through a close-fitting barrel, a frusto-conical tubular extension of said barrel having an included conical angle of from 6° to 20°, a rotatable abrader covering and held against the larger, open end of the frusto-conical tube by spring pressure, means for driving the conveyor to deliver particulate solids to and compact them in the frusto-conical tube, and means, responsive to a predetermined load and degree of compaction of fine solids in the frusto-conical tube, to rotate the abrader to effect detrition of the solids plug and to discharge solids from the valve so long as the requisite load and compaction of solids is maintained in the tube to overcome said spring pressure.

References Cited in the file of this patent

UNITED STATES PATENTS

| Number | Name | Date |
|---|---|---|
| 450,689 | Willard | Apr. 21, 1891 |
| 1,713,719 | Severson | May 21, 1929 |
| 1,737,090 | Meyers | Nov. 26, 1929 |
| 2,459,180 | Richter | Jan. 18, 1949 |
| 2,537,570 | Bossert | Jan. 9, 1951 |
| 2,556,653 | Kelso | June 12, 1951 |
| 2,567,448 | Rickerich | Sept. 11, 1951 |